United States Patent Office 3,155,633
Patented Nov. 3, 1964

3,155,633
SILICONE ADHESIVE COMPOSITION CAPABLE OF BONDING SILICONE RUBBER TO METAL WITHOUT THE USE OF A PRIMER
Keith E. Polmanteer, Midland, Mich., assignor to Dow Corning Corporation, Midland, Mich., a corporation of Michigan
No Drawing. Filed Sept. 8, 1958, Ser. No. 759,392
1 Claim. (Cl. 260—37)

This invention relates to a silicone adhesive composition capable of bonding silicone rubber to metal without the use of a primer.

This application is a continuation-in-part of applicant's copending application Serial No. 569,974, filed March 7, 1956, now abandoned.

A great deal of study has gone into the problem of adhering silicone rubber first to itself and second to metal surfaces. One solution has been to apply to silicone rubber a non-curing, pressure-sensitive adhesive composition. However, this does not form a bond which will withstand a great deal of stress. For the formation of a permanent bond between, for example, silicone rubber and metal it has been thus far necessary to prime the metal surface before any of the known adhesives would operate satisfactorily. This necessity for priming has been a great nuisance in that the choice of primer depended on the base materials to be joined, the conditions to which the bonded joint would be subjected, and the formulation of the adhesive composition itself. Consequently, a need has shown itself for an adhesive composition which is effective without the use of a primer.

The principal object of this invention is to find a silicone composition which will adhere even after high temperature aging to both silicone rubber and metal without the use of a primer and which can be heat-cured to form a permanent bond. Another object is to produce an easily-spreadable grease- or paste-like adhesive having the above physical characteristics. A third object is to produce such a composition which is solvent-free.

This object is satisfied by a new composition comprising (1) an essentially diorganopolysiloxane having a degree of polymerization of from 250 to 2100 and having per molecule an average of at least two silicon-bonded vinyl radicals, (2) from 10 to 200 parts by weight per 100 parts of (1) of a reinforcing silica filler the surface of which is coated with organosilyl groups of the formula $R''_nSi$, which groups are bonded to the silica by SiOSi linkages and in which each $R''$ is selected from the group consisting of monovalent hydrocarbon radicals of less than 7 carbon atoms and halogenated monovalent hydrocarbon radicals of less than 7 carbon atoms and $n$ has an average value of from 2 to 3 inclusive, and (3) from .1 to 10 parts by weight per 100 parts of (1) of an organic peroxide vulcanizing agent. This composition can be cured by heating preferably in the range of 200° to 250° C. for from 4 to 24 hours.

The organopolysiloxane of this invention can contain as organic radicals any monovalent hydrocarbon radical or halogenated monovalent hydrocarbon radical. More specifically, these radicals can be alkyl radicals such as methyl, ethyl, isopropyl, t-butyl, 2-ethylhexyl, and octadecyl; alkenyl radicals such as vinyl, allyl, and butadienyl; cycloalkyl radicals such as cyclopentyl and cyclohexyl; cycloalkenyl radicals such as cyclopentenyl and cyclohexadienyl; aryl radicals such as phenyl, xenyl and naphthyl; alkaryl radicals such as tolyl and xylyl; and aralkyl radicals such as benzyl and phenylethyl. Similarly these radicals can be halogenated such as chloromethyl, $\alpha,\alpha,\alpha$-trifluorotolyl, 3,3,3-trifluoropropyl, 2,4,6-tribromophenyl, $\alpha$-chlorovinyl, and 2,3-dibromo-3-iodocyclopentyl.

Specific examples of polysiloxanes which are operative herein are dimethylpolysiloxane, phenylmethylpolysiloxane, vinylmethylpolysiloxane, octadecylmethylpolysiloxane, xenylmethylpolysiloxane, diethylpolysiloxane, ethylmethylpolysiloxane, tolylmethylpolysiloxane, diphenylpolysiloxane, cyclohexylmethylpolysiloxane, chlorophenylmethylpolysiloxane, chloromethylmethylpolysiloxane, $\alpha,\alpha,\alpha$-trifluorotolylmethylpolysiloxane, trifluoropropylmethylpolysiloxane, and bis-trifluoropropylsiloxane and copolymers thereof. Preferably the siloxanes of this invention are primarily dimethylpolysiloxane or copolymers of this siloxane with 3,3,3-trifluoropropylmethylsiloxane, phenylmethylsiloxane, vinylmethylsiloxane and diphenylsiloxane units.

It is necessary, however, that there be at least two vinyl groups per molecule in this diorganopolysiloxane. It is preferable that the average number of vinylsiloxane units in the polysiloxane does not exceed 1 mol percent. With increasing amounts of vinyl radicals the siloxane enters a transition stage gradually becoming resinous. It is also preferable that at least half of the remaining organic radicals in the polysiloxane are methyl radicals, but this is not necessary.

In the expression "an essentially diorganopolysiloxane" the term "essentially" indicates that some monoorganosiloxane units, e.g. monomethylsiloxane, and some triorganosiloxane units, e.g. trimethylsiloxane, can be present. However, the degree of substitution of the polysiloxane should be at least 1.99 and less than 2.01.

It is preferable that the organopolysiloxane component (1) be vinyl-endlocked. The organopolysiloxane then has essentially the general formula

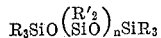

in which each R can be a vinyl, lower alkyl or phenyl radical, at least one R on each silicon being vinyl and each R' can be any monovalent hydrocarbon radical of less than 8 carbon atoms or halogenated monovalent hydrocarbon radical of less than 8 carbon atoms, there being in said polysiloxane no more than 1 mol percent total alkenyl siloxane.

There can be one, two or three vinyl groups attached to each terminal silicon atom. The remaining R groups on the terminal silicons can be any lower alkyl group of less than 8 carbon atoms or an aromatic hydrocarbon radical of less than 8 carbon atoms. Preferably the R groups are methyl, phenyl and vinyl and combinations thereof. Specific examples of end-blocking siloxanes which can be employed in this invention are vinyldimethylsiloxane, divinylmethylsiloxane, trivinylsiloxane, phenylmethylvinylsiloxane, diphenylvinylsiloxane, ditolylvinylsiloxane, ethylvinylmethylsiloxane and butyldivinylsiloxane.

The term "has essentially the general formula" means that the molecules of the polymers may contain attached to silicon traces of O-metal, OH, halogen, H and other extraneous groups normally present in commercial siloxane polymers and/or small amounts of cyclic siloxane impurities.

The R' groups in the diorganosiloxane units of the polymers of this invention can be any monovalent hydrocarbon radical of less than 8 carbon atoms and any halogenated monovalent hydrocarbon radical of less than 8 carbon atoms. Thus, specific examples of diorganosiloxane units which can be in the copolymers of this invention are dimethylsiloxane, diphenylsiloxane, methylvinylsiloxane, phenylvinylsiloxane, allylmethylsiloxane, butenylmethylsiloxane, hexylmethylsiloxane, tolylmethylsiloxane, trifluoroethylmethylsiloxane, trifluorovinylmethylsiloxane, chlorophenylmethylsiloxane, $\alpha,\alpha,\alpha$-trifluorotolymethylsiloxane, cyclohexylmethylsiloxane, and cyclohexenylmethylsiloxane. Preferably at least 50 percent of the R' groups should be methyl groups.

The polysiloxanes employed in this invention must have an average of at least 250 siloxane units per molecule. The number of siloxane units in the molecules is hereinafter referred to as the degree of polymerization or D.P. This degree of polymerization corresponds to a viscosity of about 500 cs. at 25° C. although the viscosity will vary somewhat depending upon the groups attached to the silicon. If the D.P. is below this critical range, the polymers are not suitable for making rubber. The polysiloxanes should have a viscosity less than 1,000,000 cs. to give the ultimate in the combination of stress-strain and fabrication properties. A D.P. in the range of 2000 to 2100 produces viscosities in the range of 800,000 cs. to 900,000 cs. at 25° C. For easily-spreadable adhesives it is preferable that the polymers have a viscosity below 100,000 cs.

The polysiloxanes employed in this invention are commonly prepared by condensation of silanols prepared by hydrolysis of the corresponding hydrolyzable silanes.

The particular fillers which are operative in this invention are reinforcing silica fillers. These are defined in U.S. Patent 2,541,137 and in the copending application of Leslie J. Tyler, Serial No. 160,100, filed May 4, 1950, now Patent 2,863,846. These fillers generally have a surface area of at least 100 square meters per gram and include, for example, fume silicas and silica aerogels. The surface of these fillers is coated with organosilyl groups of the formula $R''_n Si$, e.g. trimethylsilyl groups, which groups are bonded to the silica by SiOSi linkages and in which $R''$ is a monovalent hydrocarbon radical of less than 7 carbon atoms or halogenated monovalent hydrocarbon radical of less than 7 carbon atoms and $n$ has an average value from 2 to 3 inclusive. Such fillers can be prepared by any suitable method.

One suitable method is to pre-prepare a finely divided silica such as one may obtain by burning a volatile silane and thereafter treat the silica with a reactive organosilicon compound such as a chlorosilane or a silazane. Under these conditions the organosilicon compound reacts with the surface of the silica to form organosilyl groups thereon.

A second method is that of reacting a silica hydrogel or organogel with a reactive organosilicon compound. In general, this method entails precipitating silica from an alkali metal silicate solution to form a silica hydrogel and thereafter treating the gel with a reactive organosilicon compound such as a chlorosilane, an alkoxysilane or a siloxane. When a siloxane is employed treatment should be carried out under acidic conditions which insure complete reaction of the organosilicon compound with the silica.

The organosilyl groups which are attached to the silicas of this invention can be any group of the formula $R''_n Si\equiv$ in which $R''$ is any monovalent hydrocarbon radical of less than 7 carbon atoms or any halogented monovalent hydrocarbon radical of less than 7 carbon atoms such as methyl, ethyl, propyl, butyl, hexyl, vinyl, allyl, phenyl, pentafluoroethyl, chlorophenyl, 3,3,3-trifluoropropyl, chloromethyl and trifluorovinyl.

For the purpose of this invention there can be an average of from two to three $R''$ groups on the silicon of the organosilyl group. Thus, the silica can be coated with diorganosilyl groups, triorganosilyl groups or mixtures of such groups with or without limited amounts of monoorganosilyl groups. For example, the surface of the silica can coated with dimethylsilyl or trimethylsilyl groups or a combination thereof, or a combination of trimethylsilyl and monomethylsilyl groups. Non-treated silica fillers as well as the metallic oxides do not give the adhesive strength to this composition which is accomplished by the treated fillers described above. However, these inert fillers can be incorporated as an additional ingredient into the composition.

The range of from 10 to 200 parts of filler per 100 parts of polysiloxane does not apply to every treated filler. The filling power of these fillers is well known in the art to vary with such factors as particle size and degree of agglomeration. When a filler having a high degree of filling power is employed, it is unusual if more than 80 parts of filler can be employed per 100 parts of polysiloxane without seriously diminishing spreadability and fabrication properties. On the other hand, a non-filling filler can be used in large amounts but may be impractical in amounts less than for example 100 parts of filler per 100 parts of low viscosity polysiloxane for the reason that a lesser amount of filler will not sufficiently thicken the composition to at least a grease consistency. With a polymer having a viscosity of 10,000 cs. at 25° C. up to 200 parts per 100 parts of polymer of some treated reinforcing fillers can be incorporated into the gun without seriously deteriorating the physical properties of the composition. One the other hand only a little filler, e.g. 10 parts per 100 parts of polymer, can be incorporated into high viscosity polymers before the composition becomes too stiff to spread. Less filler than this reduces the physical properties of the ultimate composition. In other words, the silica proportions are practical limitations covering all types of silica within the other limits set forth. To prepare the compositions of this invention, it is only necessary to know that, starting with any polysiloxane within the scope of the claims, when a sufficient amount of any filler within the scope of the claims is added to the polysiloxane to produce a spreadable grease which will not collapse, good adhesion will be ultimately obtained.

In addition to the fillers, the compositions of this invention can contain other additives such as compression set additives, oxidation inhibitors, thermal stabilizers, plasticizers, pigments and other materials commonly employed in organosilicon rubbers. Care must be taken, however, that these additives be at least as heat stable as the base composition.

The compositions of this invention are cured simply by heating at a temperature above the decomposition point of the peroxide vulcanizing agent. This technique is now conventional in the art. Examples of operative organic peroxides include benzoyl peroxide, tertiary butyl perbenzoate, dicumylperoxide, bis-dischlorobenzoylperoxide and di-t-butylperoxide. These peroxides can be used in amounts ranging from 0.1 to 10 parts by weight per 100 parts of the siloxane. It is desirable that sufficient pressure be applied during preliminary curing to insure good contact of the adhesive and surfaces to be bonded together.

The compositions of this invention give superior adhesive rubbers to equivalent molecular weight polymers which contain no vinyl groups or to stocks containing no treated fillers.

The materials of this invention will act as adhesives for silicone rubbers, fabrics, laminates such as polyester glass laminates, and metals such as steel, brass, and aluminum. The adhesive layer should be from 5 to 20 mils thick for best results. As with other fluid silicone rubber compositions, the compositions of this invention are also useful for molding.

The following examples are illustrative only and should not be construed as limiting the invention which is properly delineated in the claims. The test employed herein involves spreading a particular adhesive composition on a clean metal surface, laying on top of the adhesive a silicone rubber tape, compressing the system to give an adhesive thickness of approximately 10 mils, curing the adhesive as shown, and pulling the tape back on itself 180° from the metal surface. The strength necessary to remove the tape was measured in pounds per inch of tape width. In some cases the tape itself failed before the adhesive, thereby indicating that the adhesive strength of the composition of this invention was at least the amount shown.

In these examples the following materials were used:

(A) An hydroxyl-endblocked dimethylpolysiloxane containing 0.193 mol percent vinylmethylsiloxane units and having a viscosity at 25° C. of 20,000 cs.
(B) A vinyldimethylsiloxy-endblocked dimethylpolysiloxane containing 7.5 mol percent phenylmethylsiloxane units and having a viscosity at 25° C. of 22,500 cs.
(C) A vinyldimethylsiloxy-endblocked dimethylpolysiloxane having a viscosity at 25° C. of 44,800 cs.
(D) The polysiloxane C having a viscosity at 25° C. of 25,900 cs.
(E) A hydroxy-endblocked dimethylpolysiloxane having a viscosity at 25° C. of 45 to 55 cs.
(F) A trimethylsilyl-treated reinforcing silica having a surface area of from 300 to 400 square meters per gram, which was prepared by treating a mixture of an acid silica hydrogel and a silica aerogel with isopropanol and hexamethyldisiloxane until the water in the gel was replaced by hexamethyldisiloxane and thereafter separating the water and removing the hexamethyldisiloxane and alcohol from the gel.
(G) A reinforcing fume silica having an average surface area of at least 100 square meters per gram, which surface was treated with siloxane E.
(H) A reinforcing silica hydrogel having a surface area of from 120 to 150 square meters per gram, said surface being saturated with trimethylsilyl groups attached through SiOSi bonds.
(J) A reinforcing silica formed by transforming sodium silicate in solution to a silica sol in the presence of an ion exchange resin, refluxing said sol with HCl to produce a silica having an average surface area of from 250 to 500 square meters per gram and treating said silica to saturate its surface with di- and triorganosilyl units attached through SiOSi bonds.
(K) Dibenzoylperoxide.
(L) Ditertiarybutylperoxide.
(M) Dicumylperoxide.
(N) A rubber produced by curing for 24 hours at 250° C. a tape composition of 100 parts of a hydroxyl-endblocked dimethylpolysiloxane containing 7.5 mol percent phenylmethylsiloxane units and having a Williams plasticity of .060 to .070 inch, 30 parts of a reinforcing silica filler having an average surface area of from 120 to 150 square meters per gram, 7.5 parts of the same reinforcing silica filler the surface of which is coated with trimethylsiloxy groups attached to the silica through SiOSi bonds, 2 parts of siloxane E, 5 parts of iron oxide, 2 parts tertiary-butylperbenzoate and .25 parts dibenzoylperoxide.
(P) A rubber tape produced by curing for 24 hours at 250° C. a tape composition of 100 parts by weight of an hydroxy-endblocked dimethylpolysiloxane having a Williams plasticity of .050 to .060 inch and containing .142 mol percent methylvinylsiloxane units, 30 parts of a reinforcing fume silica having a surface area of at least 100 square meters per gram, 15 parts of diatomaceous earth, 5 parts barium zirconate, 1 part zinc oxide and 1 part bis-dichlorobenzoylperoxide added as a 40% by weight solution in trimethylsiloxy-endblocked dimethylpolysiloxane fluid.
(Q) A rubber tape produced by curing for 28 hours at 250° C. a tape composition of 100 parts of a vinyldimethylsiloxy-endblocked dimethylpolysiloxane gum containing 7.5 mol percent phenylmethylsiloxane units and having a Williams plasticity of approximately .070 inch, 60 parts by weight of filler F above, 1 part of siloxane E, 6 parts by weight iron oxide, 0.6 part by weight tertiary butyl perbenzoate, and 1 part bis-dichlorobenzoylperoxide added as a 40% by weight solution in trimethylsiloxy-endblocked dimethylpolysiloxane fluid.
(R) A rubber tape produced by curing for 24 hours at 150° C. a tape composition of 100 parts of a 3,3,3,-trifluoropropylmethylpolysiloxane containing 0.5 mol percent methylvinylsiloxane units and having a Williams plasticity of at least .080 inch, 20 parts of a reinforcing fume silica having a surface area of at least 100 square meters per gram, 10 parts of a reinforcing silica xerogel having a surface area of approximately 160 square meters per gram, 4.5 parts of siloxane E, 1.0 part of iron oxide, 1.0 part of benzoylperoxide, each of the last dispersed in methyl silicon fluid.
(S) A reinforcing colloidal silica having a surface area of from 150 to 175 square meters per gram treated with dimethyldichlorosilane and trimethylchlorosilane until the surface was saturated with trimethylsilyl and dimethylsiloxane units attached through SiOSi bonds.
(T) A trimethylsilyl-coated reinforcing silica having a surface area of from 500 to 700 square meters per gram, which was prepared by treating an acid silica hydrogel with isopropanol and hexamethyldisiloxane until the water in the gel was replaced by hexamethyldisiloxane and thereafter separating the water and removing the hexamethyldisiloxane and alcohol from the gel.

EXAMPLE 1

Compositions were prepared in the proportions shown in the following table and were spread on Base Member I. Base Member II was placed on the adhesive and the resulting sandwich was compressed to an adhesive thickness of approximately 10 mils. Each sandwich was heated first for 5 minutes at 260° F. and then for the additional periods shown. The adhesive strength was determined. An asterisk indicates failure in Base Member II rather than failure of the adhesive.

Table

| 100 Parts of Siloxane | Parts of Filler | Parts of Vulcanizing Agent | Additives | Base members | | Average Adhesive Strength (pounds per inch) After— | | |
|---|---|---|---|---|---|---|---|---|
| | | | | I | II | 4 hrs. at 480° F. | 24 hrs. at 480° F. | 7 days at 480° F. |
| A | 30F | 1.5K | | Steel | N | 11.5 | 14 | |
| A | 30F | 2.5K | | do | N | *10 | *13 | |
| A | 30F | 1.5K | | do | N | *21 | *19 | |
| A | 30F | 2.5K | | do | N | | *26 | |
| A | 30F | 2.5K | 0.6 parts ferric octoate | do | N | | *22 | |
| A | 30F | 2.5K | 20 parts siloxane E | do | N | | *25 | |
| A | 30F | 2.5K | 0.6 parts ferric octoate + 20 parts siloxane E | do | N | | *20 | |
| A | 30F | 2.5K | 0.6 parts ferric octoate | do | N | 16.5 | *17 | |
| A | 30F | 2.5K | 6 parts iron oxide | do | N | 14 | *17 | |
| B | 30F | 1.5K | | do | N | 14 | 10 | |
| B | 30F | 2.5K | | do | N | *24 | *22 | |
| B | 30G | 1.5K | | do | N | 2 | 16 | |
| B | 30G | 2.5K | | do | N | <1 | 23 | |
| B | 30H | 2.5K | | do | N | *17 | 8 | |
| C | 30F | 1.5K | | do | N | 10 | 15 | |
| C | 30F | 2.5K | | do | N | 11.5 | 15 | |
| D | 30F | 1.5K | | do | N | *25 | *26 | |

Table—Continued

| 100 Parts of Siloxane | Parts of Filler | Parts of Vulcanizing Agent | Additives | Base members | | Average Adhesive Strength (pounds per inch) After— | | |
|---|---|---|---|---|---|---|---|---|
| | | | | I | II | 4 hrs. at 480° F. | 24 hrs. at 480° F. | 7 days at 480° F. |
| D | 30F | 2.5K | | Steel | N | 24 | 26 | |
| D | 30F | 2.5K | | do | N | 24 | *21 | |
| D | 30F | 1.5K | | do | N | *26 | *25 | |
| D | 30F | 1.5K | | do | N | 28 | *30 | |
| D | 30F | 1.5K | | do | N | *33 | *29 | |
| D | 30F | 1.5K | | do | N | 28 | *30 | |
| D | 30F | 1.5K | | do | N | 40 | *33 | |
| D | 30F | 1.5K | | do | N | 40 | *28 | |
| D | 30J | 1.5K | | do | N | *26 | *22 | |
| D | 30F | 2 L | | do | N | *24 | *16 | |
| D | 30F | 2.5M | | do | N | 15 | *14 | |
| D | 30F | 2 L | | Brass | N | 28 | 25 | |
| D | 30F | 1.5K | | Aluminum | N | 15 | *24 | |
| D | 30F | 1.5K | | Steel | N | 30 | 29 | 18 |
| D | 30F | 1.5K | | do | P | 4 | 22 | 13 |
| D | 30F | 1.5K | | do | Q | 28 | 22 | 11 |
| D | 30F | 1.5K | | do | P | | 27 | |
| D | 30F | 1.5K | | do | N | 21 | 26 | |
| D | 30F | 1.5K | | do | Q | | 42 | |
| D | 30F | 1.5K | | do | R | | 23 | |
| D | 30F | 1.5K | | P | P | 18 | 20 | |
| D | 30F | 1.5K | | N | N | 28 | 27 | |
| D | 30F | 1.5K | | N | P | 26 | 25 | |
| D | 30F | 1.5K | | Q | Q | 26 | 26 | |
| D | 30J | 1.5K | | Steel | P | 22 | *26 | |
| D | 30J | 1.5K | | Aluminum | N | 8 | *21 | |
| D | 100S | 1.5K | | Steel | P | 15 | *23 | |
| D | 100S | 1.5K | | do | N | 12 | 16 | |
| D | 150S | 1.5K | | do | P | 27 | 25 | |
| D | 150S | 1.5K | | do | N | 28 | *30 | |
| D | 50H | 1.5K | | do | P | 18 | 8 | |
| D | 50H | 1.5K | | do | N | 22 | *24 | |
| D | 30F | 1.5K | | do | P | *30 | *27 | |
| D | 30F | 1.5K | | do | N | 23 | *26 | |
| D | 20T | 1.5K | | do | P | *23 | 9 | |
| D | 20T | 1.5K | | do | N | 22 | 15 | |

EXAMPLE 2

Equivalent results are obtained when a fume silica having a surface area greater than 100 square meters per gram, prepared by burning silicon tetrachloride, is treated with the following chlorosilanes so that its surface is coated with the following organosilyl groups, is substituted for filler G in the procedure of Example 1. All percents are mol percents.

| Chlorosilane | Organosilyl group on surface of silica |
|---|---|
| $Me_2SiCl_2$ | $Me_2Si=$ |
| $PhMe_2SiCl$ | $PhMe_2Si-$ |
| 5% $Me_2ViSiCl$ | 5% $Me_2ViSi-$ |
| 95% $Me_3SiCl$ | 95% $Me_3Si-$ |
| 5% $MeSiCl_3$ | 5% $MeSi\equiv$ |
| 20% $Me_2SiCl_2$ | 20% $Me_2Si=$ |
| 75% $Me_3SiCl$ | 75% $Me_3Si-$ |
| $\begin{array}{c}Me_2\\|\\CF_3CH_2CH_2SiCl\end{array}$ | $\begin{array}{c}Me-\\|\\CF_3CH_2CH_2Si-\end{array}$ |
| $Et_3SiCl$ | $Et_3Si-$ |

EXAMPLE 3

Equivalent results are obtained when vinyldimethlysiloxy-endblocked dimethylpolysiloxanes having viscosities at 25° C. of 3,000 cs., 10,000 cs. and 70,0 cs. are substituted for siloxane D in the procedure of Example 1.

EXAMPLE 4

Excellent adhesion is obtained between a steel surface and tape N when a composition comprising (1) 100 parts by weight of a copolymer having an average D.P. of 2000 and being composed of 7.5 mol percent phenylmethlysiloxane units, 0.142 mol percent methylvinylsiloxane units, 92.258 mol percent dimethylsiloxane units and 0.1 mol percent dimethylvinylsiloxane units, (2) 30 parts by weight of a trimethylsilyl-coated reinforcing silica xerogel and (3) 0.4 part by weight tertiary-butylperbenzoate is spread in a ten mil layer between the steel surface and the tape and the combination is cured for 15 minutes at 150° C. followed by 24 hours at 250° C.

That which is claimed is:

A method for bonding together two surfaces which consists of applying to at least one surface a composition composed of (1) an essentially diorganopolysiloxane having a degree of polymerization of from 250 to 2100 and having per molecule an average of at least two silicon-bonded vinyl radicals, (2) from 10 to 200 parts per 100 parts of (1) of a reinforcing silica filler the surface of which is coated with organosilyl groups of the formula $R''_nSi$, which groups are bonded to the silica by SiOSi linkages and in which groups each $R''$ is selected from the group consisting of monovalent hydrocarbon radicals of less than 7 carbon atoms and halogenated monovalent hydrocarbon radicals of less than 7 carbon atoms and $n$ has an average value of from 2 to 3 inclusive, and (3) from 0.1 to 10 parts per 100 parts of (1) of an organic peroxide curing catalyst, thereafter applying the other surface to the adhesive layer and curing the adhesive by heating.

References Cited in the file of this patent

UNITED STATES PATENTS

| 2,541,137 | Warrick | Feb. 13, 1951 |
| 2,863,846 | Tyler | Dec. 9, 1958 |
| 2,897,869 | Polmanteer | Aug. 4, 959 |

FOREIGN PATENTS

| 766,665 | Great Britain | Jan. 23, 1957 |

UNITED STATES PATENT OFFICE
CERTIFICATE OF CORRECTION

Patent No. 3,155,633                      November 3, 1964

Keith E. Polmanteer

It is hereby certified that error appears in the above numbered patent requiring correction and that the said Letters Patent should read as corrected below.

Column 5, line 39, after "rubber" insert -- tape --; column 7, EXAMPLE 2, in the table, second column, next to the last formula thereof, for same column 7, line 62, for "70,0 cs." read -- 70,0C0 cs. --.

Signed and sealed this 27th day of April 1965.

(SEAL)
Attest:

ERNEST W. SWIDER                      EDWARD J. BRENNER
Attesting Officer                        Commissioner of Patents